April 22, 1924.
C. W. SCOTT
CORN HARVESTER
Filed Jan. 30, 1922
1,491,638
2 Sheets-Sheet 2
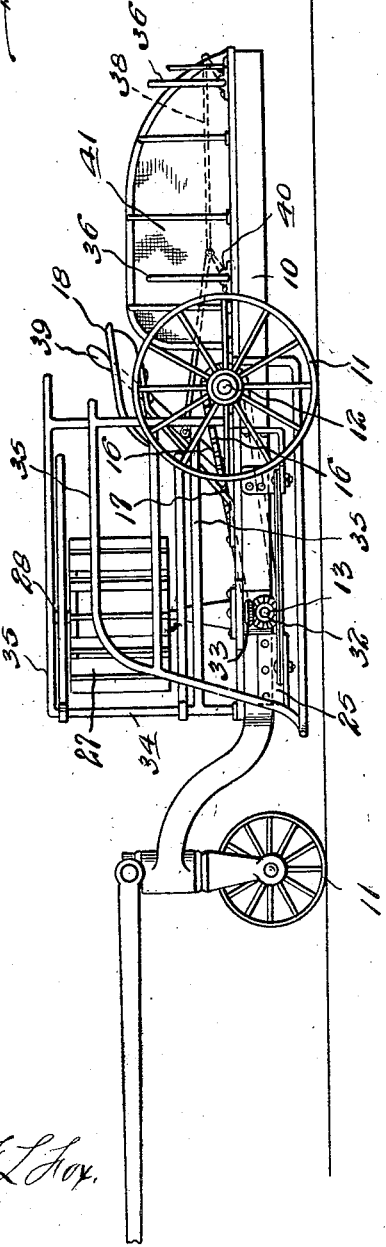
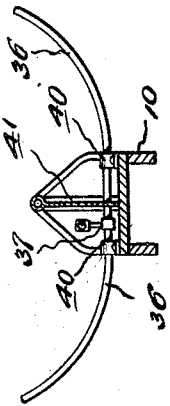
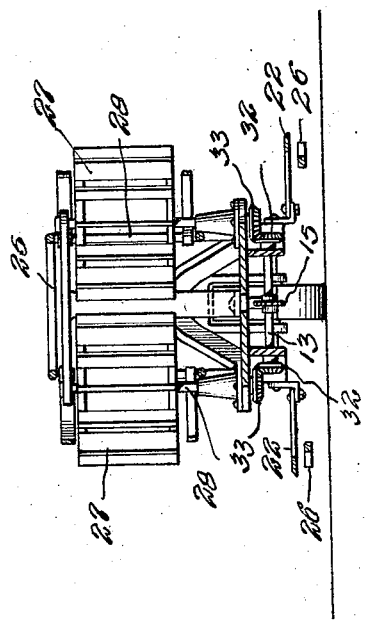
C. W. Scott
INVENTOR
BY Victor J. Evans
ATTORNEY
WITNESSES:

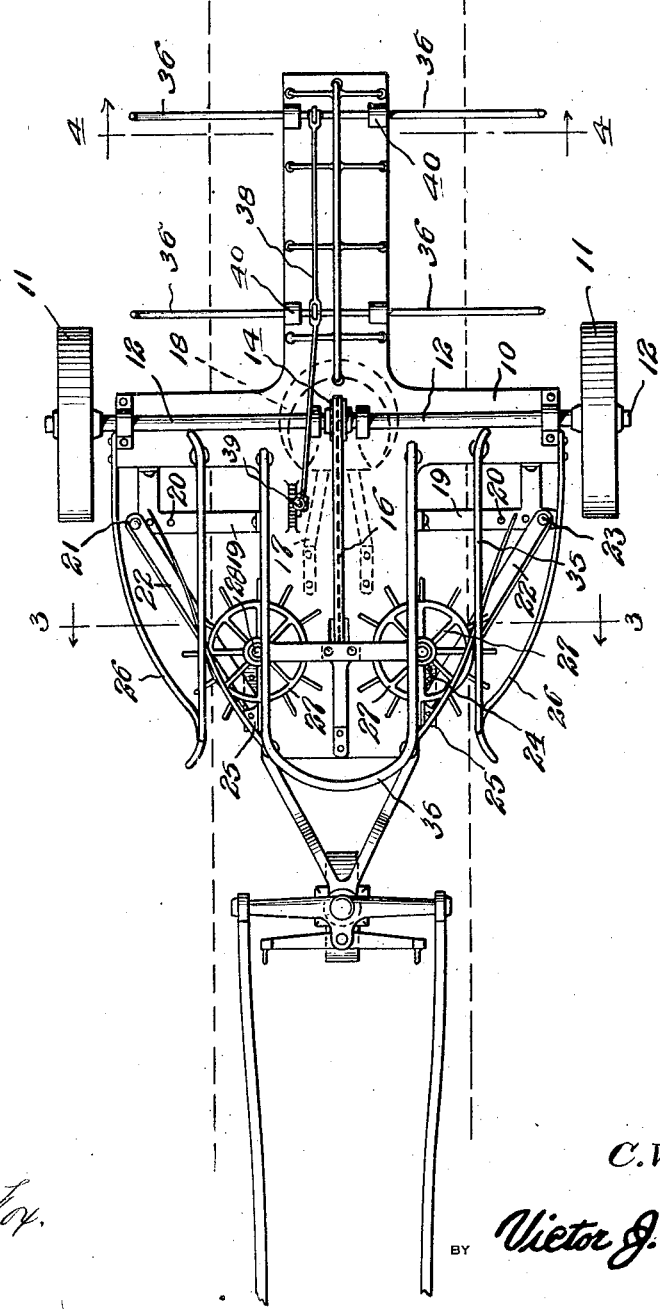

Patented Apr. 22, 1924.

1,491,638

UNITED STATES PATENT OFFICE.

CLATHAN W. SCOTT, OF YELLOW SPRINGS, OHIO.

CORN HARVESTER.

Application filed January 30, 1922. Serial No. 532,872.

*To all whom it may concern:*

Be it known that I, CLATHAN W. SCOTT, a citizen of the United States, residing at Yellow Springs, in the county of Greene and State of Ohio, have invented new and useful Improvements in Corn Harvesters, of which the following is a specification.

It is the object of the present invention to provide a corn harvester of novel construction and by means of which one or two rows of corn may be cut at the same time, and subsequently arranged upon a platform in groups, which are held together in bundle-like formation through the instrumentality of means operable from the driver's seat for this purpose.

Other objects and advantages will appear when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1 is a top plan view.
Figure 2 is a side elevation.
Figure 3 is a sectional view taken on the line 3—3 of Figure 1, looking in the direction of the arrows.
Figure 4 is a similar view taken on the line 4—4 of Figure 1, looking in the direction of the arrows.

Referring to the drawings in detail, the machine consists of a wheeled frame 10 which may be propelled in any suitable manner. The rear wheels 11 are connected by means of an axle 12, while journaled upon the frame 10 is a shaft 13 which is arranged in spaced parallel relation to the axle 12. A sprocket 14 is carried by the axle 12, and trained over this sprocket and also over a similar sprocket 15 carried by the shaft 13 is an endless chain 16, through the instrumentality of which the shaft 13 is rotated incident to the rotation of the axle 12. Supported on the frame is a supporting member 17 upon which is arranged the driver's seat 18. Projecting from each side of the frame 10 immediately in advance of the supporting member 17, is a plate 19 having a longitudinal series of openings 20 with which the opening 21 in the adjacent end of the blade 22 is adapted to register to receive a pin 23. The forward end of this blade is provided with a similar opening which is adapted to be brought into registration with any one of a plurality of openings 24 provided in a plate 25 which is also attached to the frame 10 but at a right angle to the plate 19. By reason of this construction, it is manifest that the cutting blades at the opposite sides of the machine can be adjusted to vary the angle or degree of inclination with respect to the frame. Arranged adjacent each side of the machine is one or more resilient members 26 which serve in the capacity of guards to direct the corn toward the cutting blades incident to the progress of the machine as will be readily understood. Also, for the purpose of bending the corn in the direction of the cutting blades, to facilitate severing of the corn, I make use of a toothed drum for each cutting blade. These drums are indicated at 27 and are disposed with relation to the blade, and inwardly of the resilient guards in a manner illustrated. Each drum is supported by a shaft 28. These drums are simultaneously operated by means of the shaft 13, the opposite end of the latter supporting bevelled gears 32 which mesh with similar gears 33 carried by the adjacent extremities of the shafts 28 for supporting said drums. It is of course understood that the machine may be constructed to cut a single row of corn, in which instance, the use of these drums, cutting blades and other necessary parts illustrated are eliminated from one side of the machine. Supported upon the frame by means of standards 34 is a wire frame-like structure 35 which protects the operator from being injured by contacting the toothed drums or cutting blades.

The severed corn is gathered by the operator who occupies the seat 18 and is grouped upon the frame at the rear of the machine. The severed corn is arranged upon the rack bars at the rear of the machine, and at either side of the longitudinal partition 41. It will be noted that each of these rack bars includes a straight intermediate portion and terminates to provide curved extremities 36 which project beyond both sides of the machine. The straight intermediate portion of each rack bar is journalled in bearings 40, it being understood that the bars are mounted for rotation, so that the position of the hook like extremities can be reversed when it is desired to dump the bundles of stalks on the ground. Carried by the straight portions of these rack bars are projections which are connected by the rod 38, and this rod is connected with a lever 39 disposed within convenient reach of the operator so that the rack bars can be operated when desired. The normal position of the rack bars is such that the curved extremities extend upwardly to receive the stalks at either side of the partition 41, and these stalks may be tied in bundle formation before they are dumped upon the ground as desired. However, when the lever 39 is operated in one direction, the position of the rack bars is reversed, the bars being rotated so as to project the curved extremities downwardly which of course allows the bundles to fall to the ground.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

1. A corn harvester of the character described, a wheeled frame, cutting means arranged at the forward end of the frame, said frame including a reduced portion projecting rearwardly therefrom, a longitudinal partition rising centrally from said portion, rack bars journalled on said portion beneath the partition and arranged transversely of the latter, each rack bar terminating to provide curved portions normally extended upwardly and adapted to receive the stalks when severed, and means including a manually operable lever for turning said rack bars to reverse the positions thereof and whereby said stalks are deposited in bundles upon the ground.

2. In a corn harvester, a wheeled frame, brackets supported thereby and having a plurality of openings, divergently arranged cutting blades having their corresponding extremities pivoted on said brackets, means adjustably supporting the other adjacent extremities of said blades, whereby the blades can be arranged to vary their degree of inclination with respect to the frame, resilient guides projecting forwardly from the opposed sides of the frame and curved toward the front thereof, and slightly spaced from said blades, vertically disposed toothed drums arranged between but in close proximity to the respective blades, and means for simultaneously rotating said drums incident to the progression of the machine.

In testimony whereof I affix my signature.

CLATHAN W. SCOTT.